United States Patent
Preisner

(10) Patent No.: US 7,337,050 B2
(45) Date of Patent: Feb. 26, 2008

(54) METHOD AND APPARATUS FOR CONTROLLING A GEAR SHIFT IN A PARALLEL SHAFT GEAR OF A MOTOR VEHICLE

(75) Inventor: Marian Preisner, Buhl (DE)

(73) Assignee: LuK Lamellen und Kupplungsbau Betelligungs KG, Buehl (DE)

( * ) Notice: Subject to any disclaimer, the term of this patent is extended or adjusted under 35 U.S.C. 154(b) by 196 days.

(21) Appl. No.: 10/906,276

(22) Filed: Feb. 11, 2005

(65) Prior Publication Data

US 2005/0182544 A1  Aug. 18, 2005

(30) Foreign Application Priority Data

Feb. 13, 2004 (DE) ............ 10 2004 007 101

(51) Int. Cl.
*B60K 23/00* (2006.01)
(52) U.S. Cl. .................................. 701/51; 701/55
(58) Field of Classification Search ............ 701/51, 701/55, 54, 56, 61; 475/125, 127; 477/62, 477/63, 68; 192/3.26, 3.51, 30 R; 74/329, 74/330, 331
See application file for complete search history.

(56) References Cited

U.S. PATENT DOCUMENTS

| | | | | |
|---|---|---|---|---|
| 4,732,245 A | * | 3/1988 | Hiramatsu | ............ 477/169 |
| 4,790,418 A | * | 12/1988 | Brown et al. | ............ 701/51 |
| 4,860,607 A | * | 8/1989 | Numazawa et al. | ............ 74/330 |
| 5,704,871 A | * | 1/1998 | Furukawa et al. | ............ 477/62 |
| 5,890,392 A | * | 4/1999 | Ludanek et al. | ............ 74/331 |
| 6,014,603 A | * | 1/2000 | Le Van | ............ 701/52 |
| 6,463,821 B1 | | 10/2002 | Reed, Jr. et al. | |
| 7,048,671 B2 | * | 5/2006 | Morisawa et al. | ............ 477/109 |
| 2004/0025612 A1 | * | 2/2004 | Ahnert et al. | ............ 74/329 |

FOREIGN PATENT DOCUMENTS

| | | |
|---|---|---|
| DE | 10160308 | 7/2002 |
| DE | 10308700 | 10/2003 |

* cited by examiner

*Primary Examiner*—Dalena Tran
(74) *Attorney, Agent, or Firm*—Simpson & Simpson, PLLC

(57) ABSTRACT

The invention relates to a method for controlling a gear shift, especially a pulling upshift in a parallel-shift transmission of a vehicle, said parallel-shift transmission having two transmission branches situated parallel to each other between an output shaft of a driving engine of the vehicle and a transmission output shaft, whereby an input shaft of each transmission branch is coupleable to the output shaft via a clutch assigned thereto and the input shaft of each transmission branch may be brought into rotationally fixed engagement with the output shaft having at least one prescribed gear ratio so that by disengaging the one clutch and engaging the other clutch a pulling-force-interruption-free change of the gear ratio between the engine output shaft and the transmission output shaft is possible, in which method during a gear ratio change the torque transmissible by the clutches is regulated in a controlled, prescribed manner and the load of the driving engine is regulated in such a manner that a prescribed slip of the clutches is maintained.

9 Claims, 5 Drawing Sheets

(State of the art)

(State of the art)

(State of the art)

METHOD AND APPARATUS FOR CONTROLLING A GEAR SHIFT IN A PARALLEL SHAFT GEAR OF A MOTOR VEHICLE

CROSS-REFERENCE TO RELATED APPLICATIONS

This patent claims priority of German Patent Application No. 10 2004 007 101.2, filed Feb. 13, 2004, which application is incorporated herein by reference.

BACKGROUND OF THE INVENTION

The invention relates to a method and a device for controlling a gear change, especially a pulling upshift, in a parallel-shift transmission of a vehicle.

In recent times, parallel-shift transmissions for use in passenger vehicles have been of increasing interest, especially because they enable fuel-consumption advantages over traditional automatic planetary transmissions.

BRIEF SUMMARY OF THE INVENTION

FIG. 5 shows the drive train of a conventional vehicle. A driving engine 10 is connected via a clutch device 12 to a transmission whose output shaft 16 is connected via a cardan shaft 18 and a differential 20 to rear wheels 22 of a motor vehicle.

A clutch actuator 24 is provided for operation of clutch device 12. Actuators 26 and 28 are provided for the operation of transmission 14. Actuators 24, 26, 28 are controlled by an electronic control device 30 having a microprocessor and accompanying memories. Inputs of electronic control device 30 are connected to position sensors contained in the actuators and speed sensors 32 and 34 for detecting, for example, a speed of a transmission shaft and a speed of cardan shaft 34 or output shaft 16. Furthermore, an input of control device 30 is connected to position sensor 36 of selector lever 38 for the activation of various programs of control device 30.

To control driving engine 10, engine control unit 40 is used, whose inputs are connected to position sensor 42 for detecting the position of an accelerator pedal, speed sensor 46 for detecting the speed of the crankshaft of the internal combustion engine, temperature sensor 48 for detecting an engine temperature, sensors 50 for detecting additional operating parameters of the engine and a position sensor for detecting the position of actuator 52 for load actuator 53 of driving engine 10. Furthermore, sensors 54 connected to engine control unit 40 may be provided for detecting the speeds of front wheels 56 and rear wheels 22. Engine control unit 40 is connected to transmission control device 30 via a data line, for example CAN data bus 58, through which data is communicated.

FIG. 6 diagrammatically shows the structure of clutch device 12 and transmission 14. Output shaft 58 of driving motor 10 is rotationally fixedly connected to two parallel transmission branches 60 and 62, each of which is rotationally fixedly connected via transmission unit 64 or 66 to drive shaft 16. Transmission units 64 and 66 may be conventional shift transmissions whose gears are each rotationally fixedly connected in a known way via actuation device 68 or 70. Clutches K1 or K2 are operable via actuators $24_1$ or $24_2$.

FIG. 7 shows the structure of a twin-clutch or parallel-shift transmission having a total of three shafts, namely, two input shafts 72 or 74, which may be rotationally fixedly connected via different gear sets to common output shaft 16. The gear sets are in continuous contact with each other. The gears of input shafts 72 or 74 may be synchronized in a known way via coupling members 76, which are axially displaceable on the shafts, with the shafts and brought into rotationally fixed engagement with them. To move coupling members 76 and thereby shift the gears, actuation device 78 is provided with selector element 80 and shift element 82, the selector element being operable, for example, by actuator 26 (FIG. 4) and the shift element being operable by actuator 28 in a known way to shift the individual gears. At the input end, clutches K1 and K2 are in rotationally fixed engagement with output shaft 58 of the driving engine. Clutches K1 and K2 are operated by clutch actuators $24_1$ and $24_2$ (FIG. 6).

If, for example, clutch K1 is engaged and a ratio defined by transmission branch 60 is accordingly present between output shaft 58 and output shaft 16 in the illustrated example in first, third or fifth gear, one of the gears of transmission branch 62 is shifted when clutch K2 is disengaged so that just by disengaging clutch K1 and simultaneously engaging clutch K2 a pulling-force-free ratio change from a gear of transmission branch 60 to a gear of transmission branch 62 can occur.

This gear or ratio change must be accomplished as comfortably as possible for the driver of a vehicle, whereby, depending on the position of selector lever 38, different programs may be activated in control device 30 according to which the gear change takes place in as quick, sporty, soft and comfortable a way as possible or otherwise in an optimized manner.

The actuation of clutches K1 and K2 and of the load actuator of driving engine 10 therefore occurs according to programs that are stored, for example, in control device 30 from whence actuator 52 of load actuator 53 is also operable via BUS 58 and control unit 40.

Lowering the torque of the first engaged clutch somewhat and increasing the engine torque briefly via the reduced clutch torque in a gear or ratio change so that the clutch slips is known from DE 101 60 308 A1. The slipping speed of, for example, 10 to 20 rpm is maintained via regulation of the clutch actuator during a gear change. The clutch transmitting the new gear ratio is engaged by controlled drive of its actuator, whereupon the disengagement of the clutch that transmits the torque at the beginning occurs in a controlled manner, because its slipping speed is kept constant. As soon as the "hold" clutch is completely disengaged, the "new" clutch transmits the entire engine torque and then for the time being is engaged no further. However, because the engine and thus also the engine-side half of the new clutch rotates at the speed of the transmission input shaft plus the slipping speed, but the transmission-side half of the new clutch rotates at the speed of the transmission input shaft, the engine speed is pulled down to the speed of the newly active transmission input shaft by a subsequent lowering of the engine torque to below the clutch torque of the new clutch. The deceleration of the engine brings an additional torque that stems from the energy stored in the flywheel of the engine and acts via the transmission input shaft on the transmission output shaft. The lowering of the engine torque corresponds to the torque contribution based on the deceleration of the engine so that no additional torque is applied to the transmission output shaft due to the deceleration of the engine. The new clutch is then completely engaged and the engine torque is reduced to its original value.

Running the clutch that first transmits torque to its slip limit and briefly increasing the engine torque in a pullingforce-free gear ratio change of a parallel-shift or twin-clutch transmission so that the torque-transmitting clutch slips with a reserve and the new clutch does not stick in the transition from the old clutch to the new clutch is known from DE 103 08 700 A1.

The object of the invention is to specify a method and a device for carrying it out in which a gear change of a parallel-shift transmission, especially a pulling upshift, may be as comfortably configured as possible under all conditions.

The portion of the task concerning the method is achieved using a method for the control of a gear change, especially a pulling upshift in a parallel-shift transmission of a vehicle, the transmission having two transmission branches situated between an output shaft of a driving engine of the vehicle and a transmission output shaft, whereby an input shaft of each transmission branch is coupleable to the output shaft via a clutch assigned thereto and the input shaft of each transmission branch can be brought into rotationally fixed engagement with the output shaft having at least one prescribed ratio so that by disengaging the one clutch and engaging the other clutch a pulling-force-interruption-free change of the gear ratio between the engine output shaft and the transmission output shaft is possible, in which method during a gear ratio change the torque transmissible by the clutches is changed in controlled, prescribed manner and the load of the driving engine is controlled in such a manner that a prescribed slip of the clutches is maintained.

Therefore, in the method of the invention, the torque transmissible by the clutches during a gear ratio change is controlled, i.e., changed according to a set, prescribed program, whereas the engine torque during the transmission ratio change is changed in a controlled manner such that a prescribed clutch slip is maintained. This has the advantage that the clutch torque which is decisive for the quality of the torque that is active on the output shaft of the transmission may be controlled independently and therefore optimally in relation to the desired output torque of the transmission. One objective of this adjustment lies in maintaining the slip that was set immediately before the beginning of the gear ratio change. The increase of the slip would be unpleasantly perceived by the driver as a turning away of the engine speed. A sign change of the slip is likewise unpleasant, because it would become noticeable via a torque jump at the output of the transmission.

Therefore, an embodiment of the method of the invention is preferable in which a prescribed slip that is maintained during the gear ratio change is set before the beginning of the gear ratio change on the clutch transmitting the old gear ratio.

An implementation of the method of the invention is preferred such that the torque of the clutch transmitting the old gear ratio is changed continually during the gear change to approximately zero and the torque of the clutch transmitting the new gear ratio is changed continually from approximately zero to a prescribed value.

Preferably, the sum of the torques transmissible by both clutches changes during the gear ratio change from a starting value to a final value and the starting value is related to the final value somewhat as the old gear ratio is related to the new gear ratio.

To maintain the clutch slip, the load of the driving engine is advantageously pre-controlled corresponding to the sum of the instantaneous torque values transmissible by the clutches.

Advantageously, the pre-control of the load of the driving engine is also controlled corresponding to an additional parameter, which includes at least one of the following parameters:
  dynamic portion from the acceleration of the input shaft transmitting the old gear ratio;
  torque that results from the difference between the acceleration of the speed of the driving engine and the input shaft transmitting the old gear ratio at the beginning of the gear ratio change; and,
  clutch torque error on the clutch transmitting the old gear ratio at the beginning of the gear ratio change.

To keep the slip of the clutches constant, the load of the driving engine is advantageously controlled via a D-controller to which the time derivative of the current slip is supplied as an input value.

Preferably, the load of the driving engine is regulated to hold constant the slip of the clutches alternatively or additionally using a P-controller, to which the difference of the instantaneous slip and the slip at the beginning of the gear ratio change is supplied as an input value.

The object of the invention directed to a device is achieved using a device for controlling a gear change, especially a pulling upshift in a parallel-shift transmission of a vehicle that has two transmission branches situated parallel to each other between an output shaft of a driving engine and a transmission output shaft, whereby an input shaft of each transmission branch is coupleable via a clutch assigned thereto to the output shaft, and the input shaft of each transmission branch may be brought into rotationally fixed engagement with the output shaft using at least one prescribed gear ratio, so that by disengaging the one clutch and engaging the other clutch a pulling-force-free change of the ratio between the engine output shaft and the transmission output shaft is possible, which device includes:
  an actuation device for the clutch of the first transmission branch;
  an actuation device for the clutch of the second transmission branch;
  an actuation device for a load actuator of the driving engine;
  sensor devices for detecting the slip of the first clutch and the second clutch; and
  a control device connected to the actuation devices and the sensor devices for controlling the operation of the actuation devices in such a manner that a method is implemented as described in any of claims 1 to 8.

BRIEF DESCRIPTION OF THE DRAWINGS

The invention is explained below in reference to exemplary diagrammatic drawings and with additional details.

Shown are.

DETAILED DESCRIPTION OF THE INVENTION

Figure 5:
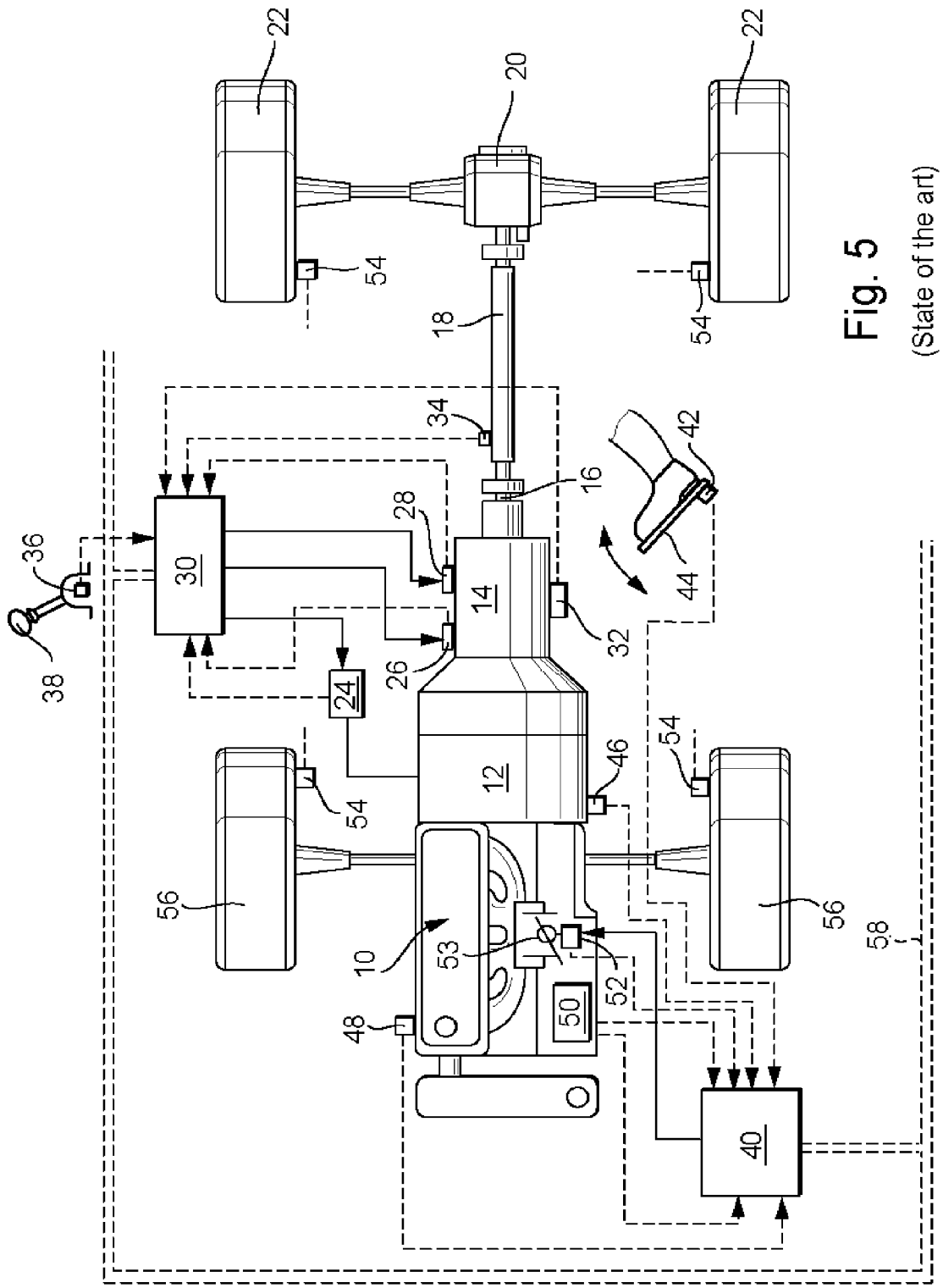
FIG. 5 is a known vehicle drive train in which the invention may be implemented.
Figure 6:
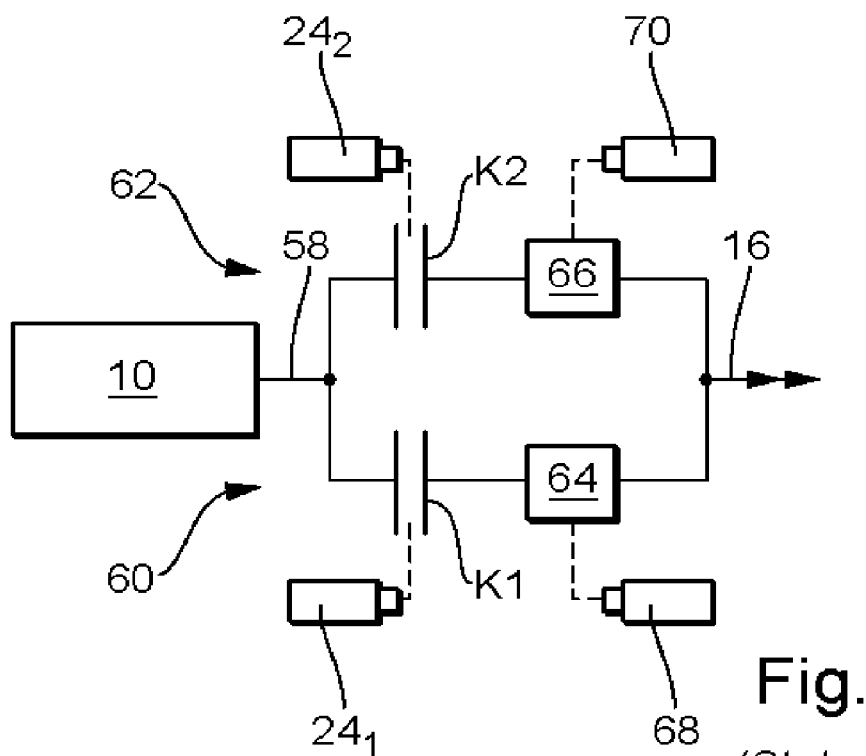
FIG. 6 is a schematic illustration of a known parallel-shift transmission; and, FIG. 7 is an exemplary design of a 3-shaft parallel-shift transmission.
Figure 7:
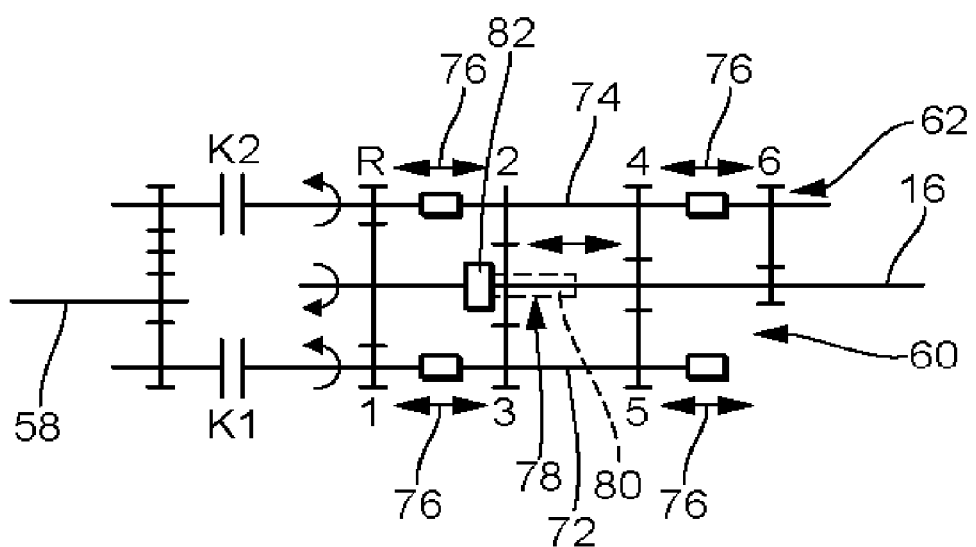

In the following description of the invention, reference is made to an exemplary vehicle drive train as shown in FIG. 5, in which clutch actuator 24 includes two actuators that are controllable independently of each other by control device 30 according to programs stored there and with which the two clutches K1 and K2 (FIGS. 5 and 6) are operable independently of each other in such a manner that a defined clutch torque is transmissible at each clutch. The slip of the clutches may be calculated via their input speed (detected by speed sensor 46) and the speeds of output shafts 72 and 74 (FIG. 6), detected by sensors 32, or from the speed of output shaft 16 (detected by sensor 34) and the gears that are active at the time (recognized by control device 30).

During a gear shift or a gear ratio change, the clutch of the old gear (old clutch) is disengaged and the clutch of the target gear (new clutch) is engaged at a specified torque. In this context the actual gear ratio change or gear shifting that is in effect on the vehicle occurs. By disengaging the old clutch and engaging the new one, the torque acting on output shaft 16 changes according to the gear ratio. The prerequisite for a transition without jerking is that both clutches slip in the overall course of operation. The clutch torques are controlled, whereas the engine torque is regulated. The regulation occurs in such a way that driving engine 10, by changing the position of its load actuator 53 at engine output shaft 58, outputs a torque that leads to a slip of the clutches, which are actuated in a controlled manner. The regulation of the position of load actuator 53 or of the torque of engine output shaft 58 occurs in the context of a pre-control on which that actual regulation is superimposed.

The pre-control is explained below in reference to FIG. 1, whereby the time is indicated on the abscissa, different torques are indicated in the top part of FIG. 1 and different speeds are indicated in the bottom part. $t_{phase}$ is used to indicate a prescribable time period during which a gear ratio change occurs and which is determined, for example, by the program activated using the selector lever.

Figure 1:
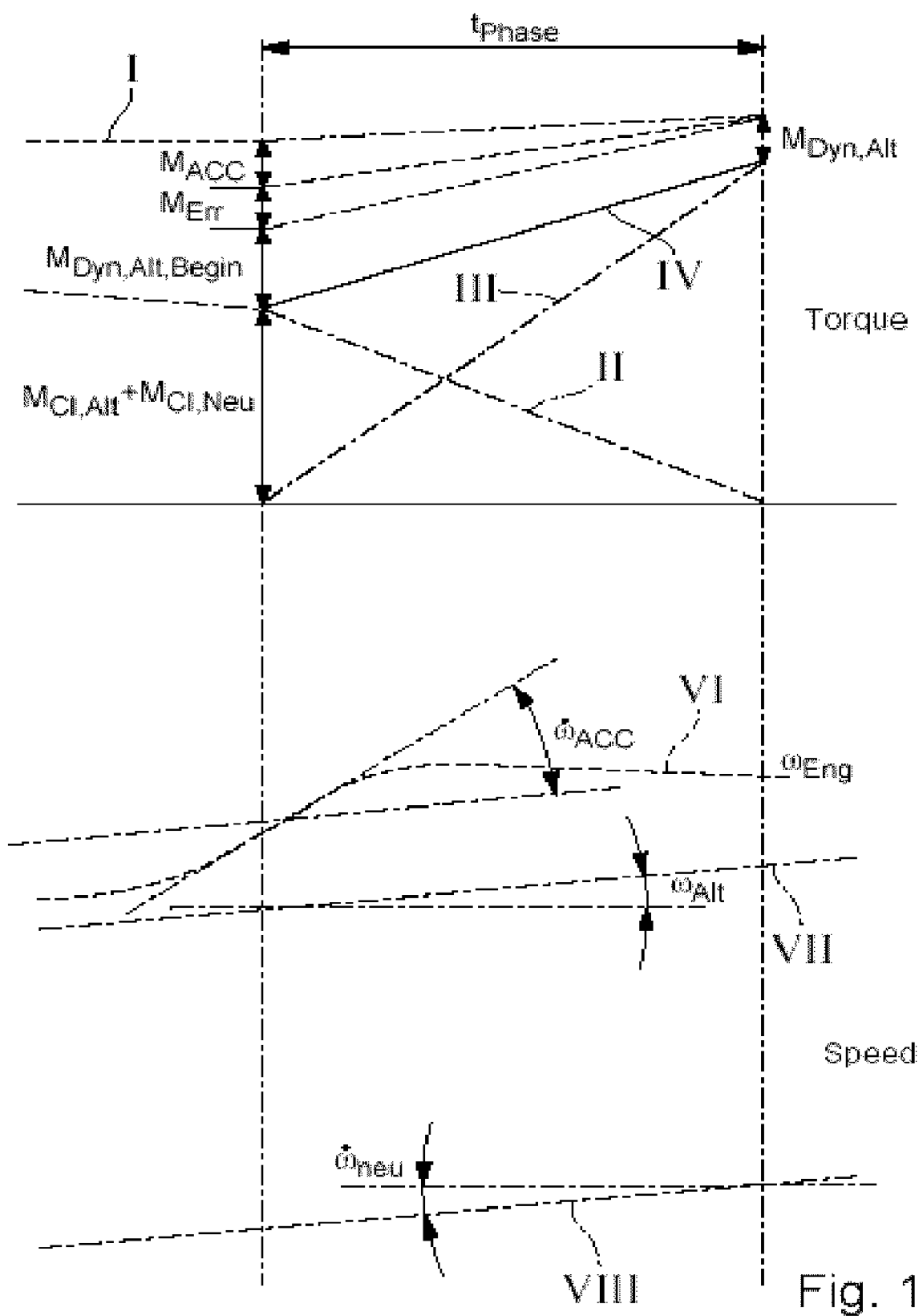
FIG. 1 shows diagrams for the explanation of parameters that are relevant for the pre-control of the driving engine.

Dashed line I of FIG. 1 indicates the pre-controlled torque on the output shaft of the driving engine; dotted and dashed curve II indicates the torque that is transmissible by the old clutch. Dashed and double-dotted curve III indicates the torque that is transmissible by the new clutch.

As is evident, before the beginning of a gear ratio change, the torque of the old clutch is lowered slightly so that the old clutch slips. The initial slip of the old clutch, which is prescribable in the program, is held to a constant value during the entire gear ratio change by modifying the engine torque, this slip being valid both for the old clutch as well as for the new clutch. The torque transmissible by the old clutch is reduced to a very small value in a linear manner beginning with the beginning of the gear ratio change until the end of the gear ratio change corresponding to the prescribed period $t_{Phase}$ of the gear ratio change. The torque that is transmissible by the new clutch is preferably increased in a controlled, linear manner according to line III up to a final value at the end of the gear ratio change, whereby the torque transmissible by the new clutch at the end preferably relates to the torque transmissible by the old clutch at the beginning of the gear ratio change as the beginning gear ratio relates to the final gear ratio; that is, in a pulling upshift, for example, the final torque is much larger than the beginning torque, just as, at the same speed of the driving engine, the output shaft in the lower gear turns faster than in the higher gear. Precontrol line IV results, which equals the sum of the instantaneous clutch torques that are transmissible at a given time, namely $M_{Cl,Alt}+M_{Cl,Neu}$.

Overlapping the pre-control torque according to line IV is a torque $M_{Dyn,Alt,Begin}$, which corresponds to the dynamic portion from the acceleration of the old transmission input shaft, i.e., $M_{Dyn,Alt}=J_{Eng}\cdot\omega_{Alt}$. This dynamic portion abates slightly during the gear ratio change.

In addition a term $M_{Err}$ is added, which is the clutch torque error on the old clutch at the beginning of the overlap, which includes the friction value and contact point error and naturally drops off to zero at the end of the gear ratio change.

The following applies for $M_{Err}$: $M_{Err}=M_{Eng}-M_{Cl,\,Alt}-M_{Cl,\,Neu}-M_{Dyn,\,Alt,\,Begin}-M_{Acc}$.

$M_{Dyn,\,Alt\,Begin}$ is determined at the beginning of the gear ratio change. $M_{Err}$ is a torque that applies only for the old clutch and is not transmissible to the new one. Thus, $M_{Err}$ is reduced during the gear change to zero.

$M_{Acc}$ is a torque that results from the difference between the accelerations of the engine speed and the old transmission input shaft, measured at the beginning of the gear ratio change, and amounts to:

$$M_{Acc}=J_{Eng}*\omega_{Acc}$$

Therefore, the following results for the pre-control engine torque:

$$M_{Eng,precontrol} = M'_{Cl,Alt} + M_{Cl,Neu} + M_{Err} \cdot \frac{t_{Phase} - t}{t_{Phase}} + M_{Dyn,Alt}$$

If one uses the aforementioned formula in the present formula for $M_{Err}$, the following results for the time t=0:

$M_{Eng,precontrol}=M_{Eng}-M_{Acc}$, as illustrated in FIG. 1.

Also added to the pre-control engine torque $M_{Eng,precontrol}$ is the torque $M_{Acc}$, which decreases in a linear manner during the gear ratio change.

The period $t_{Phase}$ may be set in advance and remains constant during a gear ratio change.

The period $t_{Phase}$ may be set in advance and remains constant during a gear ratio change.

In the curves associated with the speeds, dashed curve VI shows the course of engine speed $\omega_{Eng}$, single-dotted line VI the speed $\omega_{alt}$ of the "old" input shaft and double-dotted line VII the speed $\omega_{neu}$ of the "new" input shaft.

$\omega_{Acc}$ represents the part of the acceleration of the engine speed that exceeds acceleration $\omega_{Alt}$, that is:

$$\omega_{Acc}=\omega_{Eng}-\omega_{alt}$$

One goal of the shift strategy is to achieve an acceleration of engine speed $\omega_{Eng}$ that is equal to the acceleration of the old transmission input shaft, that is $\omega_{Acc}=0$.

Superimposed on the pre-control of the torque that is output by the driving engine, which is explained with reference to FIG. 1, is a control that includes a D-controller, which uses as an input value the time derivative of the slip $\Delta\omega_{Act}$ at a given time. Parallel to this, a P-controller is switched whose input includes the difference between the current slip $\Delta\omega_{Act}$ and the slip at the phase start or the start of the gear ratio change $\Delta\omega_{Anf}$. The task of the P-controller is to prevent the slip from phasing out completely. The P-controller is only switched on if the absolute value of the slip becomes smaller than the slip that was determined at the beginning of the gear ratio change.

Figure 2:
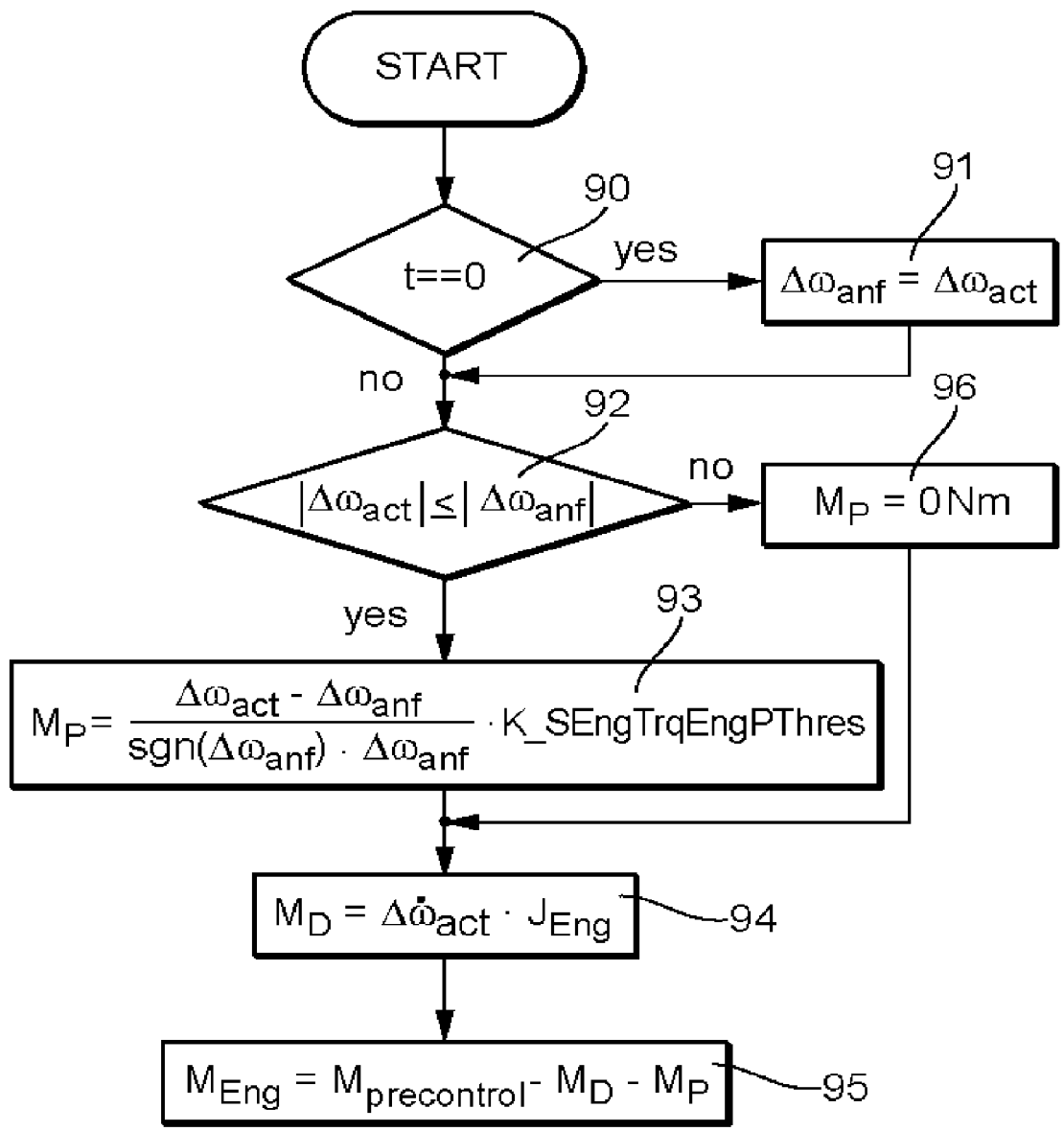
FIG. 2 shows a flow diagram for the explanation of the regulation of the engine torque.

Using the flow diagram according to FIG. 2, a control routine is explained below.

A control routine is triggered by control device 30, which indicates a forthcoming gear ratio change. If the beginning of the gear ratio change is present (t=0; step 90), then the starting slip $\Delta\omega_{Anf}$ is set equal to the current or instantaneous slip $\Delta\omega_{Act}$. The program proceeds to step 92 in which a check is made of whether the absolute value of $\Delta\omega_{Act}$ is less than or equal to the absolute value of $\Delta\omega_{Anf}$. If so, then in step 93 a proportional engine torque $M_P$ is determined by the proportional controller in the following equation:

$$M_P = \frac{\Delta\omega_{Act} - \Delta\omega_{Anf}}{\text{sgn}(\Delta\omega_{Anf}) \cdot \Delta\omega_{Anf}} \cdot K\_SEngTrqEngPThres$$

K being a stored proportionality constant.

Next, the program proceeds to step 94, in which an engine torque $M_D = \Delta\omega_{Act} J_{Eng}$ is calculated by the differential controller, so that in step 95 an engine torque $M_{Eng} = M_{precontrol} - M_D - M_P$ is set.

In the event that the condition of step 92 is not present, the proportional engine torque is set to 0 in step 96 and the program proceeds directly to step 94.

It should be pointed out that other types of controls are possible and that both the D-controller and the P-controller do not inevitably have to be present.

In the following, the control of the clutch torques is explained:

As is depicted in FIG. 1, the clutch torque of the old clutch (curve II) declines in a linear manner until it is completely disengaged. The overlap time or the period of the gear ratio change is prescribed and is a function of, for example, the shifting program that is selected at a given time.

The clutch torque of the new clutch is kept at 0 before a gear ratio change, whereupon it is ensured that the clutch may react as quickly as possible to the torque demand during the gear ratio change, and any possible slack in the transmission is overcome.

In order to be able to take into account a possible change of the driver's desired torque $M_{FB}$ during a gear ratio change, the torque of new clutch $M_{Cl, Neu}$ is recalculated in each interrupt according to the following formula (see FIG. 3):

$$M'_{Cl,Neu} = M'_{Cl,Neu} + \frac{M_{FW} - M'_{Cl,Neu}}{t_{Phase} - t} \cdot t_{step}$$

$t_{Phase}$ being the overlap or gear ratio change period, t designating the current time and $t_{step}$ designating the length of the step.

Figure 3:
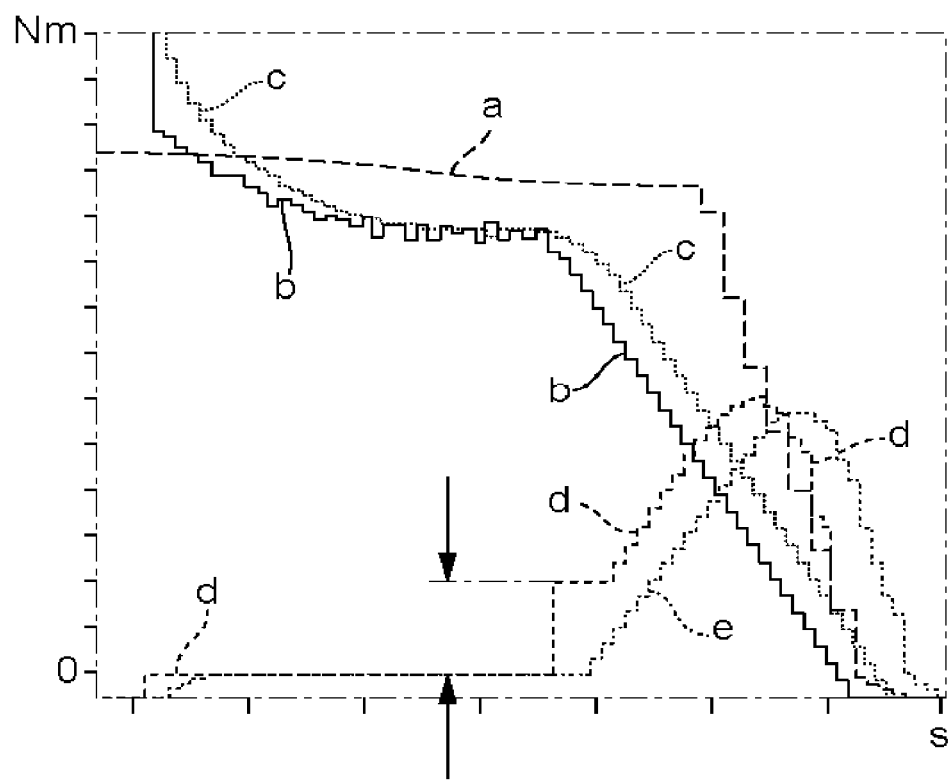
FIG. 3 shows diagrams for the explanation of a transmission ratio change with change of a driver's desired torque.

Shown in FIG. 3 are:
curve a) driver's desired torque $M_{FW}$;
curve b) the target torque $M_{Cl, Alt, Soll}$ of the old clutch;
curve c) actual torque$_{Cl, Alt, Ist}$ of the old clutch;
curve d) target torque $M_{Cl, Alt, Soll}$ of the new clutch; and
curve e) actual torque $M_{Cl, Neu, Ist}$ of the new clutch.

In order for the clutch to "respond" faster at the beginning of a gear ratio change, another clutch torque is calculated parallel to the previous clutch torque as follows:

$$M''_{Cl,Neu} = \min\frac{M_{FW}}{3}, 820.0 \cdot K\_\text{JENG}$$

The parameters of the min-function are experimentally determined and adapted to the particular vehicle. The greater of the two torques $M'_{Cl, Neu}$ and $M''_{Cl, Neu}$ is always used.

Figure 4:
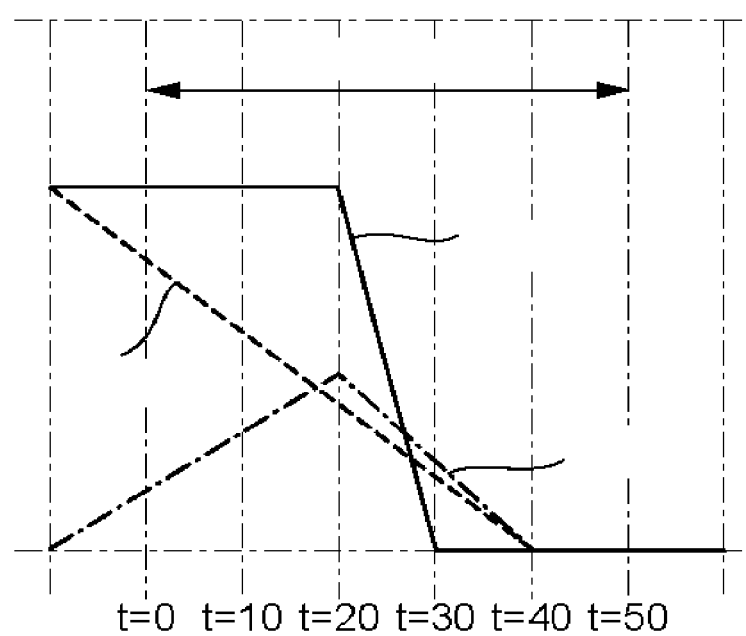
FIG. 4 shows diagrams similar to those of FIG. 3.

In reference to FIG. 4, the calculation of torque MCl is explained again using the formula $$M'_{Cl,Neu} = M'_{Cl,Neu} + \frac{M_{FW} - M'_{Cl,Neu}}{t_{Phase} - t} \cdot t_{step}$$

Overlap period $t_{Phase}$ in this context is 50 ms, step length $t_{step}$ is 10 ms and driver's desired torque $M_{FM}$ at the beginning is 100 Nm and after 30 ms drops to 0. Before the overlap, the clutch torque of new clutch $M_{Cl}$ is again 0. For new clutch torque $M_{Cl,Neu}$ the following values are attained:

At instant $t = 0$:

$$M_{Cl,Neu} = 0 \text{ Nm} + \frac{100 \text{ Nm} - 0 \text{ Nm}}{50 \text{ ms} - 0 \text{ ms}} \cdot 10 \text{ ms} = 20 \text{ Nm}$$

At instant $t = 10$ ms:

$$M_{Cl,Neu} = 20 \text{ Nm} + \frac{100 \text{ Nm} - 20 \text{ Nm}}{50 \text{ ms} - 10 \text{ ms}} \cdot 10 \text{ ms} = 40 \text{ Nm}$$

At instant $t = 20$ ms:

$$M_{Cl,Neu} = 40 \text{ Nm} + \frac{100 \text{ Nm} - 40 \text{ Nm}}{50 \text{ ms} - 20 \text{ ms}} \cdot 10 \text{ ms} = 60 \text{ Nm}$$

At instant $t = 30$ ms ($M_{FWM} = 0$ Nm):

$$M_{Cl,Neu} = 60 \text{ Nm} + \frac{0 \text{ Nm} - 60 \text{ Nm}}{50 \text{ ms} - 30 \text{ ms}} \cdot 10 \text{ ms} = 30 \text{ Nm}$$

At instant $t = 40$ ms ($M_{FWM} = 0$ Nm):

$$M_{Cl,Neu} = 30 \text{ Nm} + \frac{0 \text{ Nm} - 30 \text{ Nm}}{50 \text{ ms} - 40 \text{ ms}} \cdot 10 \text{ ms} = 0 \text{ Nm}$$

As emerges from the preceding description, the calculation ensures that at the end of the overlap phase the torque of the new clutch corresponds to the value of the driver's desired torque.

In full load shifts, in which no further increase of the engine torque is possible and the new clutch transmits substantially more than assumed, it may occur that the regulation of the engine torque that overlaps the pre-control is insufficient to prevent too sharp a decline in slip. In this case, a reaction via the clutches is necessary. Upon detection of such a situation, a bit is set and the "ramp-up" or torque increase of the new clutch is stopped.

PARTS LIST

10 Driving engine
12 Clutch device
14 Transmission
16 Transmission output shaft
18 Cardan shaft
20 Differential
22 Rear wheel
24 Clutch actuator
26 Actuator
28 Actuator
30 Control device
32 Speed sensor
34 Speed sensor
36 Position sensor 38 Selector lever
40 Engine control unit
42 Position sensor
44 Accelerator pedal
46 Speed sensor
48 Temperature sensor
50 Sensors
52 Actuator
53 Load actuator
54 Sensor
56 Front wheel
58 Engine output shaft
60 Transmission branch
62 Transmission branch
64 Transmission unit
66 Transmission unit
68 Actuation device
70 Actuation device
72 Input shaft
74 Input shaft
76 Clutch member
78 Actuation device
80 Selector element
82 Shift element

What is claimed is:

1. A method for the control of a gear shift, especially a pulling upshift, in a parallel shift transmission of a vehicle, said parallel shift transmission having two transmission branches situated parallel to each other between an engine output shaft (58) of a driving engine (10) of the vehicle and a transmission output shaft (16), whereby an input shaft (72, 74) of each transmission branch is coupleable via a clutch (K1, K2) assigned thereto to the transmission output shaft and the input shaft of each transmission branch may be brought into rotationally fixed engagement with the output shaft having at least one prescribed gear ratio so that by disengaging the one clutch and engaging the other clutch a pulling-force-interruption-free shift of the gear ratio between the engine output shaft and the transmission output shaft is possible, in which method during a gear ratio change, the torque transmissible by the clutches is modified in a prescribed, controlled manner and the load of the driving engine (10) is regulated such that a prescribed slip of the clutches is maintained.

2. The method for controlling a gear shift as described in claim 1, wherein, before the beginning of the gear ratio change, a prescribed slip is set on the clutch transmitting the old gear ratio and is maintained during the gear ratio change.

3. The method for controlling a gear shift as described in claim 1, wherein, during the gear ratio change, the torque of the clutch transmitting the old gear ratio is continuously modified to approximately zero and the torque of the clutch transmitting the new gear ratio is continuously modified from approximately zero to a prescribed value.

4. The method for controlling a gear change as described in claim 3, wherein the sum of the torques transmissible by both clutches during the gear ratio change changes continuously from a starting value to a final value and the starting value is related to the final value somewhat as the old gear ratio is related to the new gear ratio.

5. The method for controlling a gear shift as described in claim 1, wherein the load of the driving engine is pre-controlled corresponding to the sum of the instantaneous torques transmitted by the clutches.

6. The method for controlling a gear shift as described in claim 5, wherein the pre-control of the load of the driving engine is additionally controlled corresponding to an additional parameter, which includes one of the following values:
dynamic portion from the acceleration of the input shaft transmitting the old gear ratio;
torque that results from the difference between the acceleration of the speed of the driving engine and the input shaft transmitting the old gear ratio at the beginning of the gear ratio change; and
clutch torque error on the clutch transmitting the old gear ratio at the beginning of the gear ratio change.

7. The method for controlling a gear change as described in claim 1, wherein the load of the driving engine is regulated to keep the slip of the clutches constant using a D-controller to which the time derivative of the slip at a given time is supplied as an input value.

8. The method for controlling a gear change as described in claim 1, wherein the load of the driving engine is regulated to keep the slip of the clutches constant using a P-controller to which the difference between the instantaneous slip and the slip at the beginning of the gear ratio change is supplied as an input value.

9. A device for controlling a gear shift coupled to an engine, said engine having an engine output shaft, comprising:
a parallel shift transmission operatively arranged between the engine output shaft and a transmission output shaft, wherein said parallel transmission further comprising a first and second transmission branch having a first and second input shaft, respectively, a first and second clutch, respectively, and a first and second gear ratio, respectively;
a first actuation device operatively arranged to releasably engage said first clutch, wherein said first clutch rotationally fixedly engages said first input shaft with said transmission output shaft, whereby the first gear ratio is provided between the engine output shaft and the transmission output shaft;
a second actuation device operatively arranged to releasably engage said second clutch, wherein said second clutch rotationally fixedly engages said second input shaft with said transmission output shaft, whereby the second gear ratio is provided between the engine output shaft and the transmission output shaft;
a first sensor means for detecting a first slip of the first clutch;
a second sensor means for detecting a second slip of the second clutch; and,
a control means operatively arranged to control a load provided by said engine and to actuate said first and second actuation devices based on input from said first and second sensor means, respectively, whereby said load provided by said engine is arranged to maintain the first and second slips, respectively, of the first and second clutches, respectively, at respective prescribed levels.

* * * * *